United States Patent [19]

Logullo, Sr. et al.

[11] 4,418,164

[45] Nov. 29, 1983

[54] ARAMID FIBER COATED WITH POLYFUNCTIONAL AZIRIDINE

[75] Inventors: Francis M. Logullo, Sr., Hockessin, Del.; Yun-Tai Wu, Newtown Square, Pa.

[73] Assignee: E. I. Du Pont de Nemours and Company, Wilmington, Del.

[21] Appl. No.: 399,689

[22] Filed: Jul. 19, 1982

[51] Int. Cl.$^3$ .............................................. C08L 67/06
[52] U.S. Cl. .................................... 523/207; 428/375; 428/395; 428/411; 428/474.4; 428/475.2; 428/482; 428/902; 523/205; 524/86; 525/425
[58] Field of Search .................... 428/395, 375, 474.4, 428/482, 475.2, 902, 411; 525/425; 524/86; 523/205, 207

[56] References Cited

U.S. PATENT DOCUMENTS

| 2,889,289 | 6/1959 | Reeves | 528/367 |
| 3,206,328 | 9/1965 | Show | 428/395 |
| 4,328,324 | 5/1982 | Kock et al. | 525/423 |

FOREIGN PATENT DOCUMENTS

| 47-80170 | 1/1972 | Japan . |
| 47-100438 | 3/1972 | Japan . |

OTHER PUBLICATIONS

Modern Plastics Encyclopedia, 1980–1981, pp. 59–60.
Trade Literature from Cordova Chemical Co. of Michigan on XAMA®-2 and XAMA®-7, Polyfunctional Aziridines.

*Primary Examiner*—Ellis P. Robinson

[57] ABSTRACT

Coating of aramid filaments with certain polyfunctional aziridines increases interlaminar shear strength of unsaturated polyester matrix composites.

9 Claims, No Drawings

ARAMID FIBER COATED WITH POLYFUNCTIONAL AZIRIDINE

BACKGROUND OF THE INVENTION

This invention relates to improving the adhesion of aramid, preferably poly(p-phenylene terephthalamide) fiber to polymer matrices in reinforced composite structures. Such improvement is demonstrated by increased interlaminar shear strength.

The commercial importance of fiber reinforced composites has long been recognized. Both thermosetting resins such as unsaturated polyester and epoxy resins and thermoplastic resins such as nylon and polycarbonate are commonly used as matrix material for reinforced composites. Glass, carbon and boron fibers are well-known reinforcement materials. While the adhesion between certain reinforcing fibers and matrix polymer is excellent, other combinations require the use of so-called "coupling agents" in order to approach the maximum strength achievable through reinforcement. This technology is highly specialized, and the suitability of any material to improve the adhesion between any particular fiber and any particular matrix is not predictable. For example, certain silanes have been used to couple glass fiber to epoxy resins but silanes are not effective for coupling carbon fibers with phenolics. Further, some coupling agents are unsuitable because of high cost or questionable carcogenicity. Fiber surface treatments have also been used to enhance adhesion between fiber and matrix.

Relatively recently a new high strength aramid fiber, poly(p-phenylene terephthalamide) fiber has come on the market and reinforcement is one of its major end uses. It is widely used as reinforcement in tires, belts and plastics. Many coupling agents were tried with the object of improving the adhesion of this new fiber to unsaturated polyester matrices with limited success. In particular, it was highly desirable to improve the interlaminar shear strength of unsaturated polyester composites reinforced with poly(p-phenylene terephthalamide) fiber. This is discussed in U.S. Pat. No. 4,328,324 (Col. 4 1. 22-25). The present invention is directed to the solution of this problem.

SUMMARY OF THE INVENTION

This invention provides aramid fiber, particularly continuous poly(p-phenylene terephthalamide) filaments coated with an aziridine compound of the formula

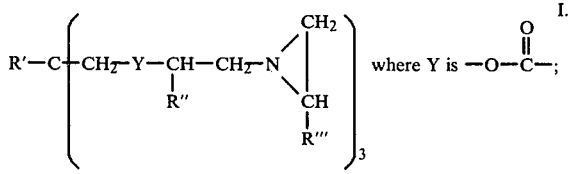

R' is alkyl or hydroxyalkyl of from 1 to 4 carbon atoms; R" and R''' are independently selected from hydrogen and methyl. Also provided is an unsaturated polyester composite reinforced with such filaments.

DETAILED DESCRIPTION OF THE INVENTION

A number of useful compounds falling within formula I above are commercially available. Among such compounds are trimethlol propane tris[beta(N-aziridinyl)propionate]

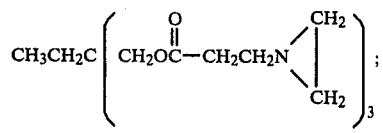

pentaerythritol tris [beta(N-aziridinyl)propionate]

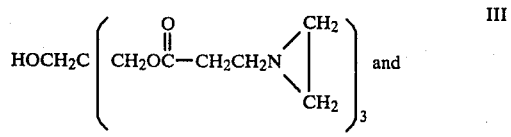

trimethylol propane tris [beta(N-2-methyl aziridinyl)propionate]

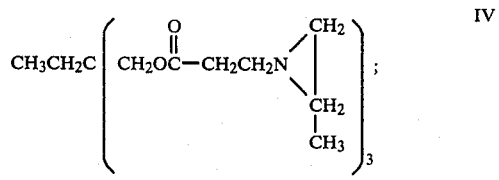

The compounds are preferably applied to the aramid fiber from aqueous sollution. Thus the compounds may be applied to continuous filaments by dip coating, finish roll applicator or metering and the filaments dried. In another procedure, staple or short length aramid fiber may be doused with an aqueous solution of the aziridine compound an then dried. The compounds cure in the drying process. If desired, curing can be hastened by heating the coated fiber at temperatures up to about 150° C. The coating solutions preferably contain about a 5% concentration of the compounds but even less than 1% concentration may be used. The percent active ingredient add-on is not critical. Between 0.1 to 10 weight percent based on the coated fiber is preferred but even smaller amounts will improve adhesion. One skilled in the art can readily determine an amount sufficient to enhance adhesion.

After the fiber is coated and dried, the resin matrix is applied. If desired, the coated filaments may be cut to short fibers and blended with unsaturated polyester resin for injection molding and other purposes. The filaments in the composite generally range from 5 to 70 volume percent. The needs of the particular end-use application generally dictate the amount, type (continuous vs. short fiber) and orientation (directionality) of the fiber to be used. It should be understood that while the greatest benefits in achieving increased adhesion are obtained with unsaturated polyester matrix materials, the coated filaments may also be used to improve adhesion to other matrix materials.

Polyester resins used with reinforcement to make a variety of products are described more fully in the Modern Plastics Encyclopedia 1980-1981 pp. 59 and 60. In the examples below, a commercially available unsaturated polyester was used for the matrix.

Composites that were prepared for demonstrating the improved adhesion obtained with the coated filaments of the invention were unidirectional filament wound samples.

The following examples are illustrative of the present invention.

EXAMPLE 12.0 grams of 1420 denier, poly (p-phenylene terephthalamide) yarn treated with a 1% aqueous solution of treating compound is wound on an aluminum cone and dried overnight in an oven at 105° C. The yarn is passed through a tensioning device and a resin dip tank where the yarn is wet out and coated with liquid matrix resin, and finally wound up in a rectangular mold. The matrix resin was as follows: isophthalic thixotropic polyester in styrene monomer, unpromoted (Freeman Chemical Corp. Stypol 40-2990) 100 parts by weight and t-butyl peroxy-2-ethylhexanoate (Pennwalt, Lupersol PDO, 50% solution) 2 parts by weight as curing agent.

The rectangular mold has two cavities of 6" long×½" wide×⅛" deep and resin coated fiber is wound into these cavities. Two cover plates are laid on the cavities and screws are partially tightened to hold the cover plates to the mold. Four shims (⅛" thick) are placed between the mold and the cover plates to give desirable sample thickness.

The complete mold is then placed in a vacuum chamber at room temperature and 25 inch vacuum for 30 minutes to degas the resin. All screws are tightened and the sample cured for one hour at 130° C.

The cured composites are cooled down to ambient temperature. The screws and cover plates of the molds are removed. (All metal parts were sprayed with mold release before winding for easy disassembly).

The composite is cut with a saw to give two unidirectional filament wound samples of 6" long×½" wide×⅛" thick. Fiber volume is 64±4%. Thickness varies between $115\times10^{-3}$ inch to $128\times10^{-3}$ inch and all fiber is aligned in the length direction.

Interlaminar Shear Strength is measured according to the test procedures of ASTM D 2344-76. A span to depth ratio of 4:1 was employed as well as loading at three points.

Table I below gives the results obtained using three treating agents within the scope of the invention and an untreated control. Also shown is the percent improvement.

| Yarn Treating Agent | Interlaminar Shear Strength (psi) |
| --- | --- |
| None | 4330 |
| Compound of Formula II | 10150 (+135%) |
| Compound of Formula III | 9300 (+115%) |
| Compound of Formula IV | 10250 (+137%) |

It is seen from the above that the interlaminar shear strength has at least doubled through use of the present invention.

Table II below shows another series of experiments in which tris(N-aziridinyl)phosphine oxide and triethylenemelamine Items 3 and 4 respectively, both outside the scope of the present invention were used as treating agents. The shear strengths are compared with results obtained with a control, Item 1, wherein no treating agent was employed and with Item 2 which exemplifies the present invention.

TABLE II

| Item | Yarn Treating Agent | Interlaminar Shear Strength (psi) |
| --- | --- | --- |
| 1 | None, Control | 3800 |
| 2 | Compound of Formula II | 7500 (+98%) |
| 3 | 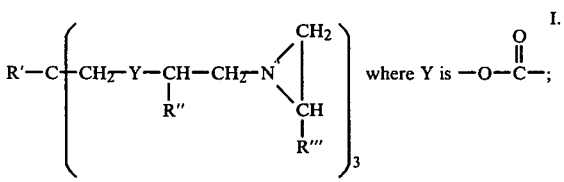 | 4520 (+19%) |
| 4 | 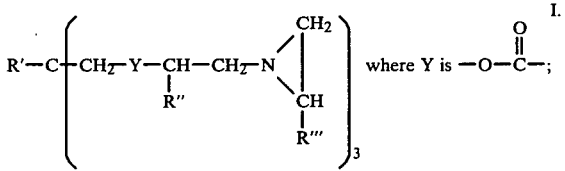 | 5200 (+37%) |

We claim:

1. Aramid fiber coated with an aziridine of the formula

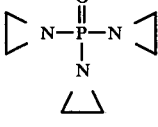

R' is alkyl or hydroxyalkyl of from 1 to 4 carbon atoms; R" and R'" are independently selected from hydrogen and methyl.

2. Aramid fiber of claim 1 wherein the aziridine is a member of the group consisting of trimethylol propane tris[beta(N-aziridinyl)-propionate], pentaerythritol tris[beta(N-aziridinyl)-propionate], and trimethylol propane tris[beta(N-2-methyl aziridinyl)propionate].

3. Aramid fiber of claim 2 wherein the aramid is poly(p-phenylene terephthalamide).

4. Aramid fiber according to claim 3 in the form of continuous filaments.

5. Aramid fiber according to claim 3 in the form of staple fiber.

6. A reinforced composite having an unsaturated polyester matrix and an aramid fiber reinforcement, said fiber having been precoated with an aziridine of the formula

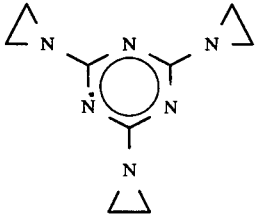

R' is alkyl or hydroxyalkyl of from 1 to 4 carbon atoms; R" and R'" are independently selected from hydrogen and methyl.

7. The composite of claim 6 wherein the aziridine is a member of the group consisting of trimethylol propane tris[beta(N-aziridinyl)-propionate], pentaerythritol tris[beta(N-2-methyl aziridinyl)propionate] and trimethylol propane tris[beta(N-aziridinyl)propionate].

8. The composite of claim 6 wherein the aramid fiber is poly(p-phenylene terephthalamide) in continuous filament form.

9. The composite of claim 6 wherein the aramid fiber is poly(p-phenylene terephthalamide) in staple fiber form.

* * * * *